(12) United States Patent
Fischer

(10) Patent No.: US 8,745,889 B2
(45) Date of Patent: Jun. 10, 2014

(54) MEASUREMENT STAND AND METHOD OF ITS ELECTRICAL CONTROL

(75) Inventor: Helmut Fischer, Oberägeri (CH)

(73) Assignee: Helmut Fischer GmbH Institut für Elektronik und Messtechnik, Sindelfingen (DE)

( * ) Notice: Subject to any disclaimer, the term of this patent is extended or adjusted under 35 U.S.C. 154(b) by 1045 days.

(21) Appl. No.: 12/724,961

(22) Filed: Mar. 16, 2010

(65) Prior Publication Data

US 2010/0241397 A1 Sep. 23, 2010

(30) Foreign Application Priority Data

Mar. 18, 2009 (DE) .......................... 10 2009 013 436

(51) Int. Cl.
*G01B 5/02* (2006.01)

(52) U.S. Cl.
USPC .............................................. 33/832; 33/572

(58) Field of Classification Search
USPC ............ 33/556, 558, 559, 561, 1 M; 702/170
See application file for complete search history.

(56) References Cited

U.S. PATENT DOCUMENTS

| | | | |
|---|---|---|---|
| 4,459,550 A | | 7/1984 | Nix nee Saxler |
| 4,498,241 A | * | 2/1985 | Nakaoki .......................... 33/832 |
| 4,599,524 A | * | 7/1986 | McMurtry .................... 307/119 |
| 4,825,557 A | * | 5/1989 | Nettleton et al. ................ 33/502 |
| 4,924,598 A | * | 5/1990 | Gruhler ............................ 33/832 |
| 5,299,252 A | * | 3/1994 | Takahashi ........................ 378/50 |
| 5,299,361 A | * | 4/1994 | Fiedler ............................ 33/559 |
| 6,011,391 A | * | 1/2000 | Nix et al. ....................... 324/230 |
| 6,016,607 A | * | 1/2000 | Morimoto et al. ............. 33/1 M |
| 6,401,352 B1 | * | 6/2002 | Kimura et al. .................. 33/832 |
| 7,024,273 B2 | * | 4/2006 | Tsuboi et al. .................. 700/195 |
| 7,076,883 B2 | * | 7/2006 | Yamamoto et al. ............. 33/556 |
| 7,352,194 B1 | | 4/2008 | Fuente Souviron et al. |
| 7,367,132 B2 | * | 5/2008 | Mitsuhashi ...................... 33/556 |
| 7,610,690 B2 | * | 11/2009 | Fischer ............................ 33/832 |
| 7,689,379 B2 | * | 3/2010 | Fuge et al. ..................... 702/150 |
| 2003/0047388 A1 | * | 3/2003 | Faitel ............................ 187/214 |
| 2004/0131148 A1 | * | 7/2004 | Fischer et al. .................. 378/50 |
| 2005/0005468 A1 | | 1/2005 | Wixey |
| 2007/0017112 A1 | * | 1/2007 | Fischer ............................ 33/832 |

FOREIGN PATENT DOCUMENTS

| | | |
|---|---|---|
| GB | 1108792 | 4/1968 |
| GB | 2 169 408 A | 7/1986 |
| GB | 2 414 079 A | 11/2005 |
| GB | 2 428 481 A | 1/2007 |
| WO | 2007/134733 A1 | 11/2007 |

OTHER PUBLICATIONS

British search report dated Apr. 15, 2010.

* cited by examiner

*Primary Examiner* — Sujoy Kundu
*Assistant Examiner* — Corey Bailey

(57) ABSTRACT

The invention relates to a measurement stand for holding a measuring probe intended in particular for measuring the thickness of thin layers, and to a method for controlling the measurement stand.

20 Claims, 6 Drawing Sheets

MEASUREMENT STAND AND METHOD OF ITS ELECTRICAL CONTROL

This application claims priority of German Patent Application No. 10 2009 013 436.0 filed 18 Mar. 2009, which is hereby incorporated herein by reference in its entirety.

The invention relates to a method for electrically controlling a measurement stand providing a movement of travel of at least one measuring probe from a starting position to a measuring position, in particular for measuring the thickness of thin layers, and to a measurement stand for carrying out the method.

DE 10 2005 034 515 A1 discloses a measurement stand for holding a measuring probe that is designed for measuring the thickness of thin layers. This measurement stand comprises a housing in which a displacement member is guided in such a manner that it can be moved up and down. At the end thereof which faces towards the object of measurement, a retainer for fixing the measuring probe is provided. The up and down movement of the displacement member is initiated by a drive unit which is controlled by an electric motor. The upper and lower end positions of the up and down motion of the displacement member are detected respectively by detectors. The up and down movement is produced by a drive unit comprising a cam disk, which moves a pivoted lever up and down. To this end, a roller running off the cam disk is provided on the pivoted lever. The cam disc is configured in such a manner that the down movement of the measuring probe from a starting position to a measuring position occurs first in a rapid mode and then in a creep mode. This measurement stand has a high repeating accuracy and is robust in use. For performing a measurement, it is necessary to pre-position relatively accurately the height of the measuring probe with respect to the surface to be measured of the object of measurement (hereinafter referred to as 'surface of the object of measurement'), taking into account the working stroke, such that the measuring probe is at least in the creep mode when touching down on the surface to be measured. In order to meet the increasing requirements in terms of flexibility for performing the measurement and for reducing set-up and take-down times, a measurement stand of this type, though well-proven in practical use, needs further development.

The invention is based on the object of proposing a measurement stand for holding at least one measuring probe and a method for activating the measuring probe by a movement of travel of at least one measuring probe, in particular for measuring the thickness of thin layers, which method is flexible in use and capable of being adapted rapidly to different measuring tasks and maintains in particular a touching down of the measuring probe on the surface to be measured for achieving exact values of measurement and a high repeating accuracy.

This object is achieved according to the present invention by a method of electrical control of a measurement stand in which prior to a first measurement a learning routine for detecting a distance between a predetermined starting position and a measuring position of the measuring probe with respect to the object of measurement is performed and the measuring probe, during the learning routine, is lowered at a predefined, preferably constant, travel speed until the measuring probe rests on the surface of the object of measurement and a free-wheel mechanism provided between the drive unit and the displacement member is activated which, after the measuring probe has touched down on the surface of the object of measurement, decouples the interaction between the drive unit and the displacement member, and via a switching device the activation of the free-wheel mechanism is detected and a control signal for stopping the motor is delivered and finally the learning routine is terminated.

This learning routine makes it possible that only an approximate pre-positioning of the measuring probe with respect to the object of measurement is necessary, which approximate pre-positioning of the measuring probe must lie within a stroke or working range for the up and down movement of the measuring probe. By this learning routine, the current distance between a starting position of the measuring probe and a position of measurement, which preferably lies on the surface of the object of measurement, is determined. By this learning routine, any measuring probe may be adjusted, in accordance with the object of measurement, to a given measuring task, such that the measuring probe is positioned in a defined manner with respect to the surface of the object of measurement. The free-wheel mechanism arranged between the drive unit and the displacement member makes it possible to flexibly adapt the travel of the measuring probe from the starting position to the respective measuring position. The only requirement is that the surface of the object of measurement must be provided within the working range or the stroke of the displacement member. Owing to the delivery of a control signal by the switching device occurring upon the touchdown of the measuring probe on the surface to be measured or immediately thereafter, the travel between the starting position and the surface to be measured is detected at the same time, and the actual touchdown of the measuring probe on the surface to be measured may thus be ensured for subsequently activated travels.

Furthermore, provision is preferably made for the further travel after the activation of the free-wheel mechanism to be detected and for the lagging travel due to the delay in motor standstill to be determined. This distance of travel is preferably taken into account in a subsequent activation of a travel for the purpose of performing a measurement in that said lagging is integrated before the detected touch-down position of the probe, such that during the movement of travel a leading speed reduction, depending on the lagging, is integrated. This enables a gentle touchdown of the measuring probe in the measuring position.

According to a preferred configuration of the method, provision is made for the travel between the predetermined starting point and the activation of the free-wheel mechanism to be determined by a number of impulses of a displacement transducer, in particular a programmable rotation encoder. This makes it possible to determine an exact distance of travel, as the detection of the number of impulses during the downward movement of the drive unit permits to eliminate the mechanical play existing within the drive unit and between the drive unit and the motor. By exactly determining the distance of travel between the starting position and the measuring position, an optimisation of the movement of travel may be achieved in that the movement of travel is first activated in a rapid mode and is then switched over to a creep mode. The entire distance of travel covered until the touchdown of the measuring probe on the surface to be measured being known, it is possible to initiate, in time, a reduction in speed, such that a gentle touchdown of the measuring probe on the surface of the object of measurement may be achieved.

Preferably, provision is made for the travel to be detected by a displacement transducer which is arranged separately from the motor. This allows, in addition, to eliminate the play between the motor and the drive unit when detecting the travel. By the activation of an up and down movement a play may occur at the point where the driving direction is changed. By a separate detection of the travel, disregarding the direction of rotation of the motor, the repeating accuracy is enhanced by the distances of travel, which remain exactly the same. The driving force for the travel is preferably generated by a band drive or belt drive, with one return pulley being driven by the motor and the second return pulley being in connection with the displacement transducer. This makes it possible to create a decoupling for the purpose of determining the travel, since the displacement transducer does not engage the drive shaft of the motor. Preferably, a rotation encoder is provided which has a compact design.

According to a further advantageous configuration of the method, provision is made for the travel of the measurement from the starting position to the measuring position for performing a measurement to be subdivided into a rapid-mode phase and a creep-mode phase, the creep-mode phase characterising itself by a leading reduction in speed which is calculated on the basis of the activation of the free-wheel mechanism. Preferably, the reduction in speed is carried out with a function of at least 1:10. Thus it is possible, on the basis of the actual course of the learning curve, to make projections for the travel for a subsequent measurement for which a new detection must be carried out, with an exact adaptation of the entire travel speed for the measuring probe being possible, such that a gentle touchdown on the surface to be measured may be achieved. The leading reduction in speed or the creep-mode phase may comprise, for example, a continuous decrease in the travel speed as the measuring probe gradually approaches the surface to be measured. The creep-mode phase may also have a constant travel speed, which is, however, considerably reduced as compared with the rapid-mode phase. Furthermore, provision may be made for the travel speed in the rapid-mode phase to be gradually reduced even before the switching over to a creep-mode phase takes place, such that a gentle transition between travel speeds may be ensured.

The object of the invention is further achieved, according to the invention, by a method in which the measuring probe is coupled to an electric control unit of the measurement stand when the measuring probe is first displaced from a starting position to a measuring position, such that during the movement of travel of the measuring probe towards the object of measurement for the purpose of performing a measurement, preferably of the thickness of thin layers, the signals of the measuring probe are monitored, and that upon detection of a first measuring signal of the object of measurement by the measuring probe the travel speed of the displacement member, and thus of the measuring probe, towards the object of measurement is reduced depending on the change of the measuring signal, such that a gentle touchdown of the measuring probe on the surface to be measured may be realised. Upon touchdown of the measuring probe on the surface to be measured, the free-wheel mechanism between the drive unit and the displacement member is activated and a control signal is delivered to the control unit via a switching device. This enables, on the one hand, a gentle touchdown of the measuring probe and, on the other hand, ensures that the measuring probe rests on the surface of the object of measurement.

This method thus enables a qualified controlling of the travel speed on the basis of the immediate feedback of a signal change of the measuring probe, depending on the approximation to the surface of the object of measurement. By the coupling of the measuring probe with the electric control unit of the measurement stand, it is possible, due to the approximation characteristic of the measuring probe, to achieve a controlled, or characteristic-curve defined, movement of travel and a gentle touchdown of the measuring probe on the surface to be measured. Since the approximation characteristic of the measuring probe is monotonic increasing, the gradient of the signal change increases as the approximation advances and the travel speed is reduced in accordance with the increasing gradient of the signal change, such that, ideally, at the moment of touching down on the surface of the object of measurement, the speed of the probe is "next to zero". Subsequently, the measurement of the thickness of thin layers may, for example, be carried out.

According to an advantageous configuration of the method, provision is made for a voltage signal of the measuring probe to be used in order to activate the motor for displacing the displacement member. During the approximation of the measuring probe to the surface of an object of measurement, the voltage signal changes in accordance with a characteristic curve of the respective measuring probe. In this way, it is possible to activate a change in speed in accordance with the voltage change occurring as the approximation advances. In doing so the amount of the increase in voltage change is preferably used to regulate the travel speed of the measuring probe.

According to a preferred configuration of the method, provision is made for the measuring signal of the measuring probe to be detected upon, or after, touchdown on the surface of the object of measurement, and for the layer thickness to be preferably derived therefrom. After a measuring probe has been calibrated to the object of measurement or rather to the substrate material of the object of measurement, it is possible to use the respective probe characteristic in order to derive, in accordance with the voltage signal, the distance from the substrate material of the surface to be measured. Once the measuring probe has touched down on the surface to be measured, the layer thickness may be derived from the measuring signal, in particular the voltage signal, of the measuring probe. A measuring probe of this type may be operated, depending on the type of substrate material, according to the magnetic inductive method or the eddy current method.

The object of the invention is further achieved by a method wherein in a phase of movement during which the travel speed of the measuring probe towards the object of measurement is reduced depending on the signal change of the measuring probe, the measuring probe is made to come to a standstill after a reference signal defining the measuring position of the measuring probe for the contactless measurement has been reached. This configuration makes it possible for the measuring probe to keep a defined, in particular a predefined, distance with respect to the surface of the object of measurement, such that, subsequent thereto, a contactless measurement is enabled. Owing to the connection between the measuring probe and the control unit, the reference signal may be stored and a pre-setting may thus be made which makes it possible for the measuring probe, disregarding the height of the surface to be measured, to always keep the same, predetermined distance from the surface of the object of measurement or from the carrier material of the object of measurement and to be disposed in a floating manner with respect to the object of measurement.

The reference signal of the measuring probe is preferably pre-set in the form of a reference voltage which, during the measuring task that is to be performed, determines a predefined distance, depending on the approximation characteristic of the measuring probe. If during the approximation of the measuring probe to the desired distance the exact desired position is overrun, a closed-loop control of the travel of the measuring probe is performed until the predetermined distance or the predefined reference signal, in particular the reference voltage, is detected and the predetermined distance has thus been reached. The predetermined distance of the measuring probe with respect to the object of measurement is preferably to be understood, as far as the measurement of the thickness of thin layers is concerned, in such a way that a distance between the measuring probe and a surface of the substrate material or the carrier material of the coated object of measurement is detected.

According to a further advantageous configuration of the invention, the measuring probe is disposed in contactless arrangement with respect to the surface of the object of measurement when it is in its measuring position. A web-like object of measurement is passed through, in a continuous or discontinuous manner, below the measuring probe and a control of the distance of the measuring probe with respect to the object of measurement is performed via the reference signal of the measuring probe, depending on the measuring signal detected by the measuring probe. This makes it possible to detect paint or highly viscous coatings on web-like materials. Preferably, a comparison of the signal detected by the measuring probe with the reference signal may enable a readjustment of the measuring probe to be carried out, such that the retainer holding the measuring probe, which also holds the distance detection sensor or further sensors/probes, is maintained and positioned at a constant distance from the object of measurement which is passed through below it. Thus, a continuous layer thickness measurement of a coating applied to a web-like material may be enabled. Basically, it is also possible to realise the distance control via the distance detection sensor.

According to a further advantageous configuration of the invention, provision is made, while the measuring probe is at a measuring position defined by the reference signal, for a distance detection sensor to be calibrated to a reference surface before the first measurement, in particular the layer thickness measurement, is carried out. Thus, the distance detection sensor is not required to be provided in an exactly defined position with respect to the measuring probe on the retainer. Rather, this calibration serves for detecting the relative position of the distance detection sensor with respect to the measuring probe so as to take this into consideration when determining the layer thickness. This makes it possible for the measuring probe to detect a defined distance from the substrate material of the object of measurement, whereas the distance detection sensor detects a distance from the surface of the object of measurement, such that the layer thickness may be determined from this difference. However, since the measuring probe detects measuring signals from the substrate materials of the coated object, it is possible to achieve, in addition, a more precise positioning of the measuring probe in the measuring position. This method has the advantage of permitting to detect not only solid coatings on a substrate material but also highly viscous coatings.

In a further advantageous configuration of the method, a further, radiation-emitting probe is envisaged to be associated with the measuring probe, which is preferably provided for performing the beta particle backscattering technique or is operated according to the X-ray fluorescence method. When the measuring probe and the further measuring probe working according to the beta particle backscattering technique are combined, provision is made for the measuring probe to ensure that the further probe which is arranged adjacent to the measuring probe and which emits further radiation is kept at a constant distance to from the surface to be measured or from the substrate material of the object of measurement. In the beta particle backscattering technique, the energy of the reflection is detected. By comparing the emitted radiation with the reflection, the basis weight of the coating may be determined and the thickness may be derived therefrom, since the basis weight is determined on the basis of the thickness of the coating and of the relative density thereof. In doing so, the beta particle radiation is to be chosen preferably in such a way that the coating is penetrated by it, the beta radiation penetrates at least partially into the substrate material, and is reflected on a quasi effectively backscattering surface formed slightly beneath the surface of the substrate material. The same is true, by analogy, of a probe for performing the X-ray fluorescence method in combination with the measuring probe.

The object of the invention is further achieved by an alternative method in that on the retainer or on the displacement member a measuring probe and a distance detection sensor are fastened, a distance with respect to the surface of the object of measurement being detected by the distance detection sensor when the measuring probe is in a starting position and a travel being activated which is slightly superior to the determined travel leading the surface of the object of measurement, and a travel speed of the measuring probe towards the surface of the object of measurement is activated, such that the measuring probe is made to touch down gently on the surface of the object of measurement.

In this embodiment, the activation of the travel speed is not carried out by the measuring probe but, instead of this, an approximation characteristic for the measuring probe ensuring a gentle touchdown on the surface to be measured is obtained by calculation from the distance between the starting position and the measuring position, as it is determined by the distance detection sensor. In doing so, different empirical approaches may be selected in order to first span a wide part of the working range in a short time using a rapid mode and subsequently enable a gentle touchdown to be carried out in a creep mode. Preferably, provision is made for an increasing reduction in travel speed to be provided as the approximation to the surface to be measured advances. By controlling a travel in such a manner that it is slightly superior to the travel that has been determined, it may be ensured that the measuring probe reliably rests on the surface of the object of measurement. At the same time, a decoupling of the interaction between the drive unit and the displacement member is achieved due to the free-wheel mechanism.

The object of the invention is further achieved by a measurement stand for holding at least one measuring probe, in particular for measuring the thickness of thin layers, in which a free-wheel mechanism is provided between the drive unit, which activates the movement of travel of the displacement member, and the displacement member, such that upon touchdown of the measuring probe or of the retainer on a surface of the object of measurement, the driving movement of the drive unit is decoupled from the displacement member and that upon activation of the free-wheel mechanism a switching device delivers a switching signal to the control unit of the measurement stand. This allows, on the one hand, to detect the touchdown of the measuring probe on the surface of the object of measurement and, on the other hand, to avoid damage to the surface to be measured due to the lagging of a motor which activates the movement of travel of the measuring probe. Owing to the free-wheel mechanism, the motor may be lagging without causing thereby any further exertion of force to the displacement member via the drive unit. Owing to the output of a switching signal by the switching device, it is possible to detect the moment of touchdown of the measuring probe on the surface to be measured, such that beginning from the start of the movement of travel at the starting position an accurate detection of the travel until the reaching of the measuring position is enabled.

According to a preferred configuration of the measurement stand, provision is made for the displacement member to be guided within the housing in such manner as to be movable up and down along an axis of movement, preferably a vertical axis, such that said displacement member is capable of being lowered by virtue of the force of its own weight. Thus, a free-wheel mechanism is formed in a simple manner which enables a lifting of the displacement member from the drive unit to occur at the slightest resistance acting on the measuring probe or on the retainer.

According to a further preferred configuration of the measurement stand, provision is made for the displacement member to rest, via an abutting surface, on a contact surface of the drive unit, while the travel of the measuring probe between the starting position and the measuring position takes place. This arrangement allows the free-wheel mechanism to be formed with a simple geometry. At the same time, a quasi-frictionless activation of the free-wheel mechanism may be realised.

According to a further preferred configuration of the measurement stand, provision is made for the displacement member to be coupled with a carriage which is movable along a guide that has at least one guide member. The guide member is preferably realised as a guide rail or a guide column provided vertically within the housing. By this movable disposition of the carriage and the contact surface arranged thereon, it is made possible that during the movement of travel of the displacement member no tilting moments will act on the displacement member, such that during the movement of travel of the displacement member, quasi no radial forces will occur.

The carriage is preferably provided with a guide rod which is arranged on the carriage on the side opposite to the displacement member and which is guided, with an end opposing the carriage, in a further guide such as to be movable up and down therein. This guide rod is preferably disposed in a horizontal arrangement. This additional guide rod serves for eliminating a further degree of freedom which might act on the displacement member. This makes it possible for the displacement member to be moved up and down in a torsion-free manner.

In a preferred embodiment, the contact surface of the drive unit is provided on a coupling member which acts on a driving member of the drive unit. This may lead to a reduction of parts and to a smaller size.

The coupling member is preferably guided, so as to be movable up and down, on the guide, in particular the at least one guide member, on which also the carriage for the up and down movement of the displacement member is preferably arranged. In this way it is possible that both the carriage and the coupling member are movable up and down on a common guide, thus eliminating further tolerances.

Furthermore, the coupling member is preferably provided with a sensor element, in particular a switching vane, which detects an upper end position of the drive unit. Thus it is ensured that an upper end position will not be overrun by the drive unit. In the opposite direction, preferably a stop is provided which preferably serves at the same time for mounting a shaft, in particular a return pulley.

In a further preferred configuration of the invention, it is envisaged that the drive unit comprises a toothed belt which is received, preferably in tension, by two return pulleys, one return pulley being provided as a driving roller of the motor. The configuration of the drive unit as a toothed belt enables a driving movement to be realised without play between the toothed belt and the return pulley, which is in particular realised as a toothed roller. Alternatively, provision may be made for a chain, a driving belt, a lifting cylinder or the like to be used instead of a toothed belt in order to provide the driving force for the motion of travel.

In a preferred configuration of the drive unit, it is envisaged that the other return pulley is equally realised as a toothed roller and drives a displacement transducer, in particular a rotation encoder. In this way, the movement of travel of the toothed belt is detected independently of the rotational driving movement of the motor. This enables a precise detection of the travel.

The switching device for delivering a switching signal preferably comprises a first and a second component, such as a forked light barrier and a switching vane. This switching device works preferably contactless, such that no friction forces are generated for activating a switching signal. A first component of the switching device is preferably provided on the carriage and a second component of the switching device is provided on the coupling member. Both components of the switching device are preferably guided on the same at least one guide member in such a way as to be movable thereon. This allows for full integration of the switching device into the free-wheel mechanism as well as for a compact arrangement. Alternatively, touch sensors or distance detection sensor as well as breaker contacts or the like may be provided.

Furthermore, between the displacement member and the carriage a guide allowing torsion is preferably provided by means of which the displacement member may be pivoted in at least two angular positions, differing from each other, about the longitudinal axis of the displacement member. This arrangement is particularly advantageous in cases in which a measuring probe and for example a distance detection sensor or some other sensor are provided on the retainer. Thus it is possible, by a simple swinging movement, to alternately move either of the sensors into a working position with respect to the surface of the object of measurement. Thus, the flexibility in use of the measurement stand is increased.

Furthermore, provision is preferably made for the respective angular position of the displacement member to be secured by a releasable catch-type connection. A depression, in particular a prismatic depression, may be provided on the guide allowing torsion with which a pin-shaped member engages that crosses the displacement member or is arranged therein.

This makes it possible to preserve a set angular position in a self-holding manner.

In a further preferred configuration of the measurement stand it is envisaged that a weight relieving mechanism is attachable to the displacement member or to the carriage. Preferably, this weight relieving mechanism comprises a lever arm which is rotatably arranged on a bearing axis and which is provided, on an end opposite the displacement member or the carriage, with a mass body which is preferably displaceable along the lever arm and/or is exchangeable with respect to the lever arm. The weight relieving mechanism is preferably fastened to the housing of the measurement stand if, due to the accommodation of a large measuring probe or of a plurality of measuring probes or sensors, a higher weight load is put on the retainer of the displacement member.

The invention, as well as other advantageous embodiments and developments thereof, will be described and explained in the following with reference being made to the examples shown in the drawings. The characteristics issuing from the description and the drawings may be applied according to the present invention either individually or as a plurality of features taken in any combination. In the drawings.

Figures 7A, 7B:
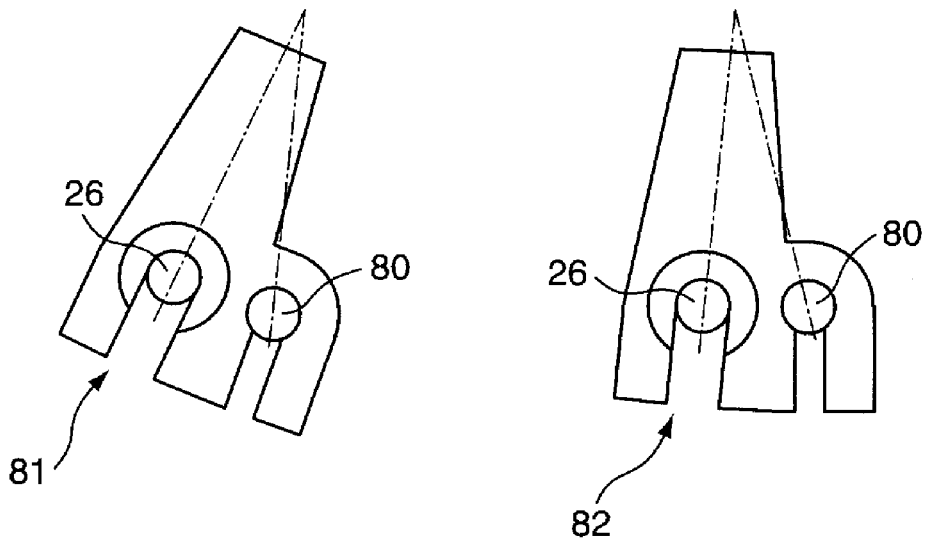
Figure 8:
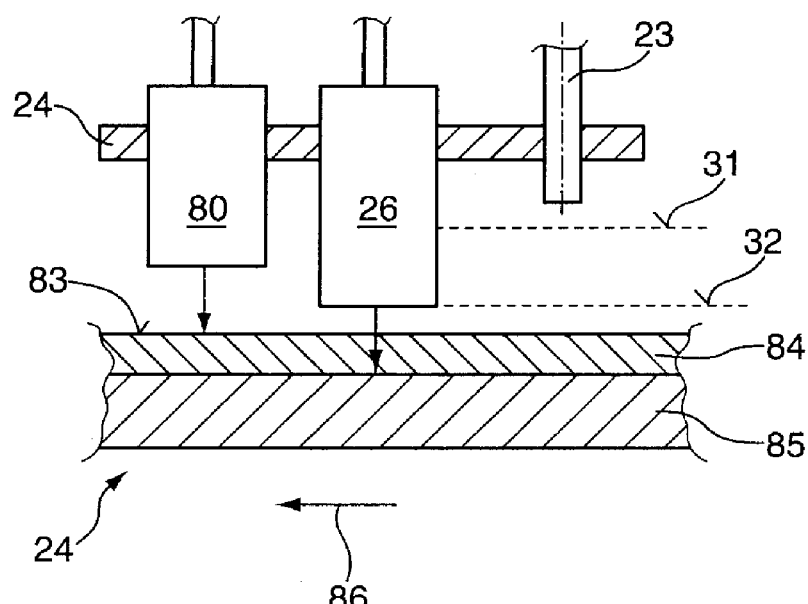

FIGS. 7a and b are perspective views of a retainer on the displacement member in two different angular positions; and FIG. 8 is a schematic view of a measuring arrangement for a contactless measurement.

Figure 1:
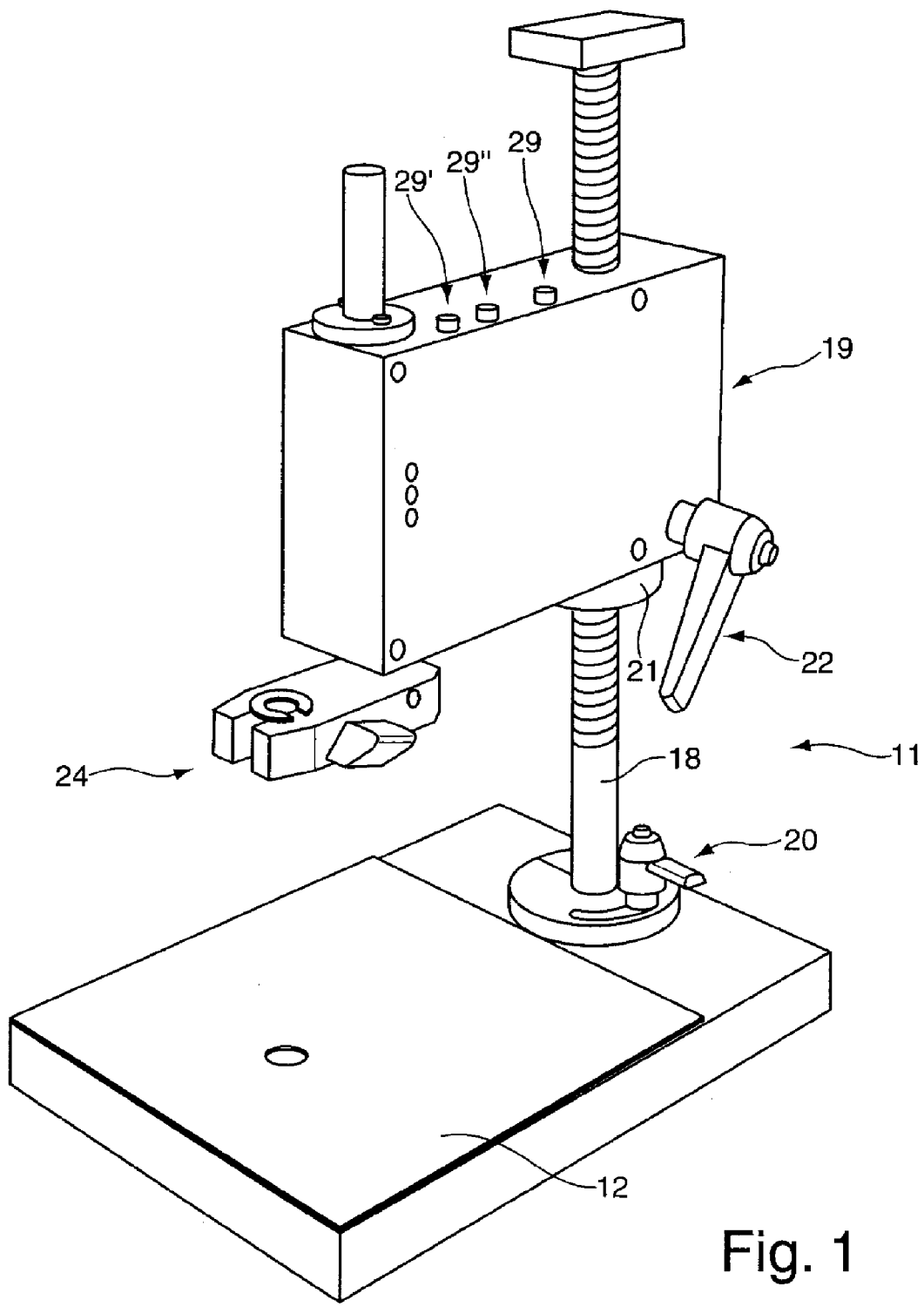
FIG. 1 is a perspective view of a measurement stand according to the present invention.
Figure 2:
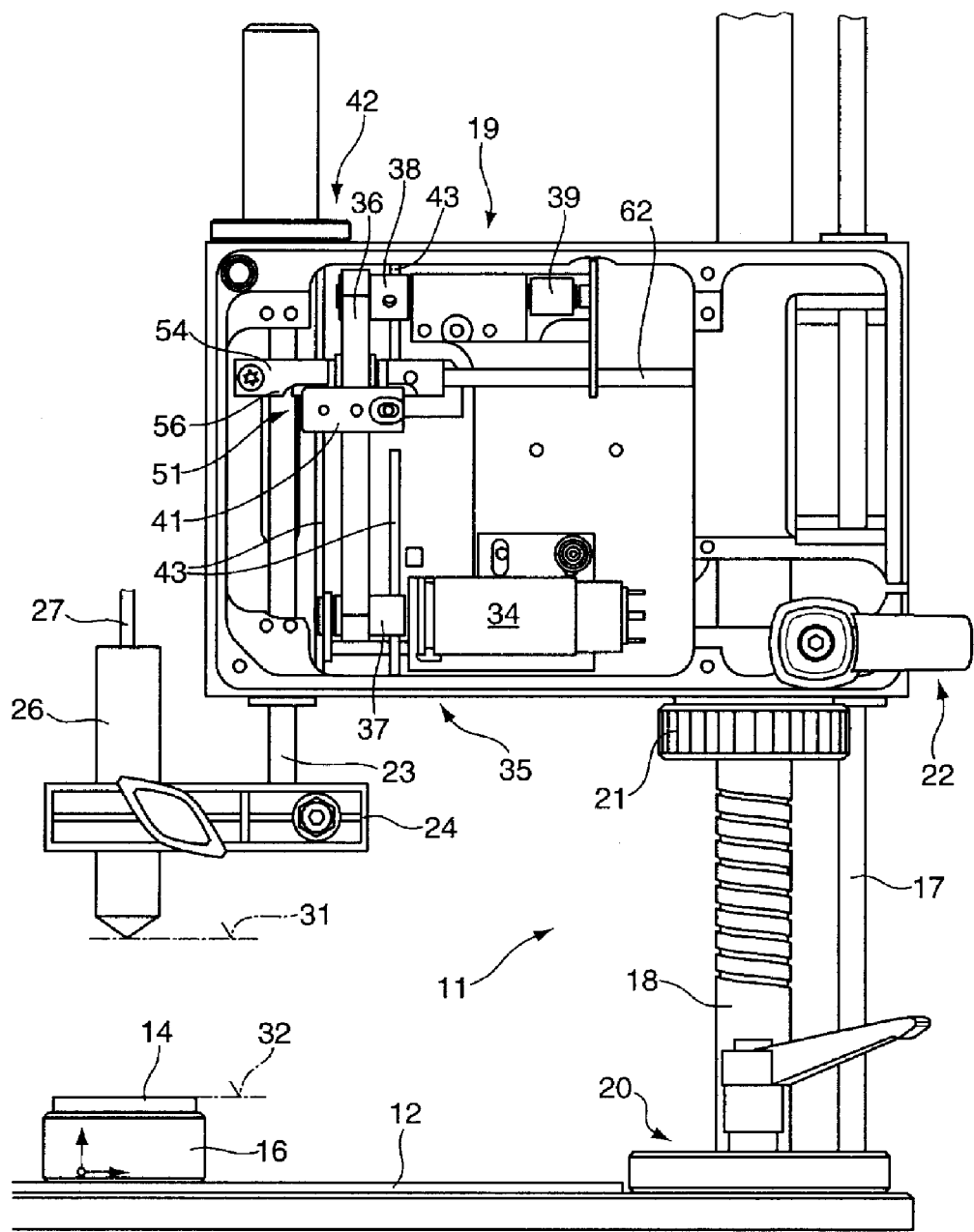
FIG. 2 is a schematic side view of a housing of the measurement stand according to FIG. 1, with a measuring probe being in a starting position.

FIG. 1 represents, in perspective, a measurement stand 11 according to the present invention, FIG. 2 a side view. This measurement stand 11 comprises a measuring table 12 where individual test objects or objects of measurement 14 may either be directly placed or held by a retainer 16. On the base of the measurement stand 11 or on the measuring table 12, an upright column 17 is provided which, together with a threaded column 18, accommodates a housing 19 in such a manner as to be height-adjustable. By the two columns 17, 18 that are arranged adjacent to each other, a parallel guide for easy height-adjustment may be achieved. An orientation of the housing 19 is enabled by the adjusting mechanism 20. The height may be set via a set screw 21. In addition, a clamping mechanism 22 is provided in order to fix the housing 19 at a given height with respect to the measuring table 12.

On the side opposite to that of the columns 17, 18, a displacement member 23 is accommodated on the housing 19 in such a manner as to be movable in an up and down direction. On the lower end of the displacement member 23, a retainer 24 is provided for the releasable fixation of measuring probes 26 or sensors or the like. Alternatively, the retainer 24 may also be configured for holding a plurality of measuring probes 26 or sensors. The measuring probe 26 is provided, for example, for measuring the thickness of thin layers. This measuring probe 26 has a sensor element with a spherical touchdown cap which is capable of touching down on a surface of the object of measurement 14. At the opposite end of the measuring probe 26, an electric line 27 is provided which is connected with a separate measuring device not represented in greater detail or which may be connected, via a connector of the measurement stand not represented in greater detail, to a control unit provided on an end face of the housing 19.

On a top surface of the housing 19, for example three actuating elements 29, in particular push buttons, are provided, the function of which will be described hereinafter.

In FIG. 2, a measuring probe 26 is arranged in a starting position 31. By means of the displacement member 23, the measuring probe 26 may be lowered and transferred into a measuring position 32, which, in this embodiment, corresponds to a touchdown position on the surface of the object of measurement 14. The distance, or travel, lying between the starting position 31 and the measuring position 32 is inferior to a working range, or length of stroke, of the displacement member 23. The housing 19 is preferably pre-positioned, via the set screw 21, with respect to the surface of the object of measurement 14, such that the starting position 31 and the measuring position 32 are situated within the working range of the displacement member 23.

Within the housing 19, an electric motor 34 is provided for controlling a movement of travel, said motor driving a drive unit which is connected with the displacement member 23. The drive unit 35 comprises a driving member 36 which is in particular realised as a toothed belt. This driving member 36 is received by upper and lower return pulleys 37, 38. These return pulleys 37, 38 are preferably realised as toothed rollers and match the contour of the teeth of the toothed belt. By an adequate selection of the toothed belt and toothed roller, a slippage-free, positive transmission of the driving motion may be obtained. The first return pulley 37 is directly fixed to the driving axle of the motor 34. The upper return pulley 38 is provided on an axis of rotation that is part of a displacement transducer 39. This displacement transducer 39 is provided as a programmable rotation encoder which detects impulses depending on the movement of travel of the measuring probe 26 from the starting position 31 to the measuring position 32 and transmits these detected impulses to a control unit.

Figure 3:
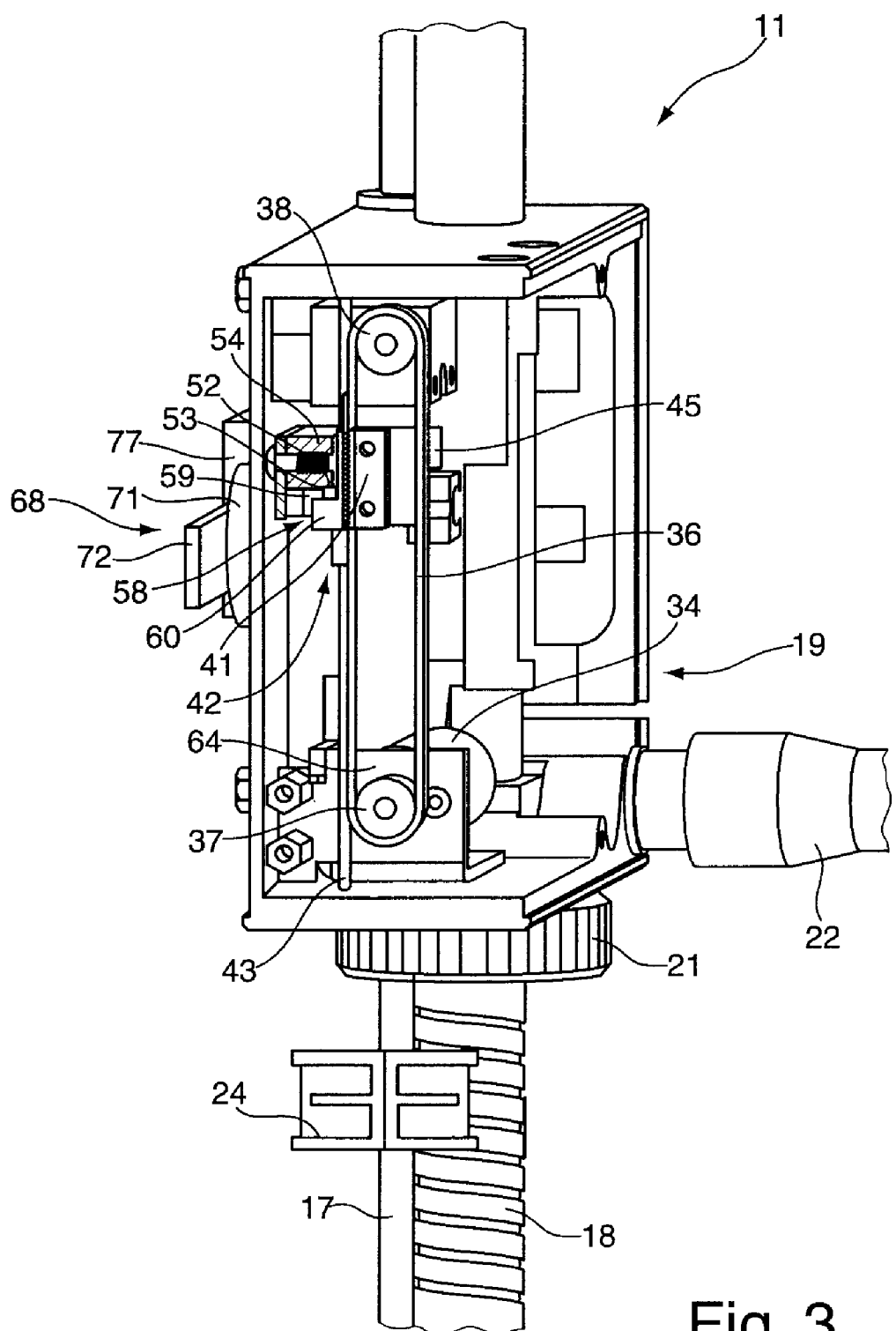
FIG. 3 is a perspective view of an end face of the housing of the measurement stand according to FIG. 1.

On the driving member 36, a coupling member 41 is provided which is represented in greater detail in FIG. 3. The coupling member 41 is guided along a guide 42 which preferably comprises two guide members 43, in particular guide rods, that are oriented parallel to each other. The coupling member 41 is connected to the driving member 36 by means of a clamping fixture. The coupling member 41, when seen in a top view, has a U-shaped contour, such that the driving member 36 is guided within the two legs of the U-shaped contour and the respective legs are applied to the guide members 43. On the coupling member 41, a switching vane 45 is preferably provided that cooperates with a sensor element or a forked light barrier arranged on a printed circuit board which is not represented in greater detail and is equally part of the control unit. Thus it is possible to detect an upper end position of the drive unit 35. Preferably, the control unit is equally arranged within the housing 19 and has merely been removed from the housing 19 for the purpose of representing the mechanical components.

Figure 4:
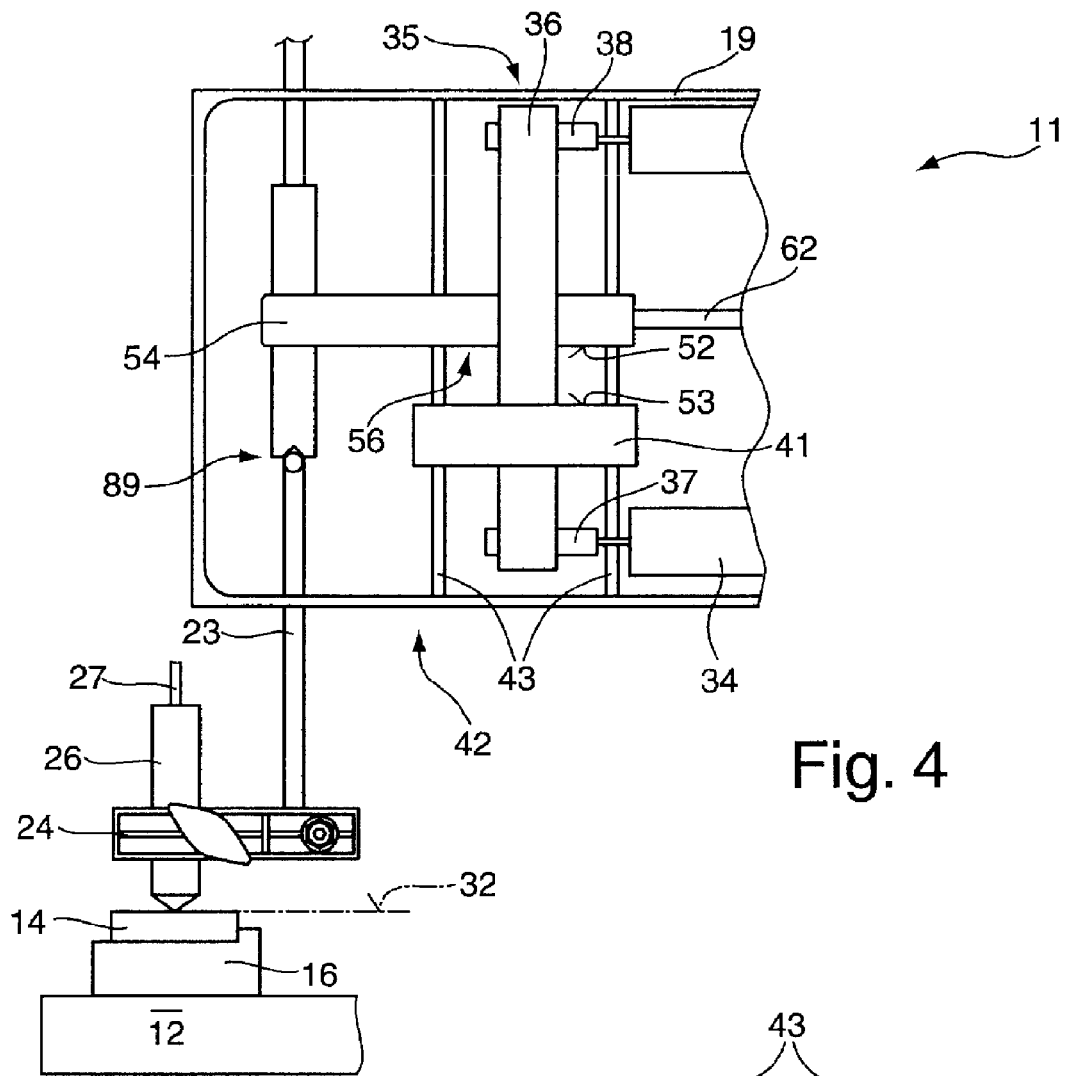
FIG. 4 is a schematic side view of the housing of the measurement stand with the measuring probe in a measuring position.

The displacement member 23 and the drive unit 35 are coupled with each other by means of a free-wheel mechanism 51 (FIG. 3). This free-wheel mechanism 51 is formed, on the one hand, by an abutting surface 52 arranged on the coupling member 41, and, on the other hand, by a contact surface 53. Owing to the own weight of the displacement member 23, the contact surface 53 rests on the abutting surface 52. This contact surface 53 is preferably provided on a carriage 54 which is preferably capable of being moved up and down on a guide 42. The carriage 54 has a holding portion 56 by means of which the displacement member 23 is releasably coupled to the carriage 54. Due to the fact that the displacement member 23 rests on the drive unit 35, provision is made, during a motion of travel of the measuring probe 26 driven by the motor 34, for a lagging of the motor 34 and thus a further lowering of the coupling member 41 immediately after the touchdown of the measuring probe 26 on a surface of the object of measurement 14 to be possible without the driving force being transmitted to the displacement member 23 and thus to the measuring probe 26. This non-interacting position of the free-wheel mechanism 51 is represented in FIG. 4.

Figure 5:
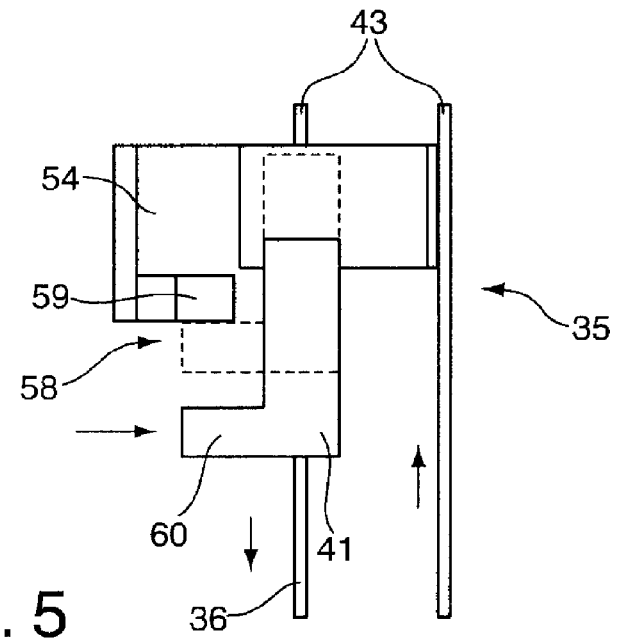
FIG. 5 is a schematic, detailed view of switching device of the measurement stand according to FIG. 1.

The free-wheel mechanism 51 preferably comprises a switching device 58 that is activated once the contact surface 53 is lifted off the abutting surface 52. To this end, the switching device 58 has a first component 59, which is arranged on the carriage 54 or on the displacement member 23, and a second component 60, which is in connection with the coupling member 41 or the drive unit 35. Preferably, the first component 59 is realised as a forked light barrier and the second component 60 as a switching finger or switching vane 45. Once the free-wheel mechanism 51 is activated, the second component 60 is moved out of the first component 59 and a switching signal is delivered to the control unit. This position is represented in broken line in FIG. 5. On the carriage 54, a printed circuit board is preferably arranged which processes the switching signal of the forked light barrier that is fixed to the printed circuit board and transmits it to the control unit. The control lines needed for this are preferably fixed on a guide rod 62 which may be moved up and down in a guide near the threaded column 18. The guide rod 62 is rigidly connected on one end with the carriage 54. On the opposite side, the guide rod has a roller bearing or sliding bearing which is capable of moving up and down within the guide. Due to this guide rod 62 any radial driving force which might act on the displacement member 23 is eliminated.

A bearing 64 for mounting the driving axle of the motor 34 serves at the same time as a stop for a motion of travel of the drive unit 35 in the downward direction.

Figure 6:
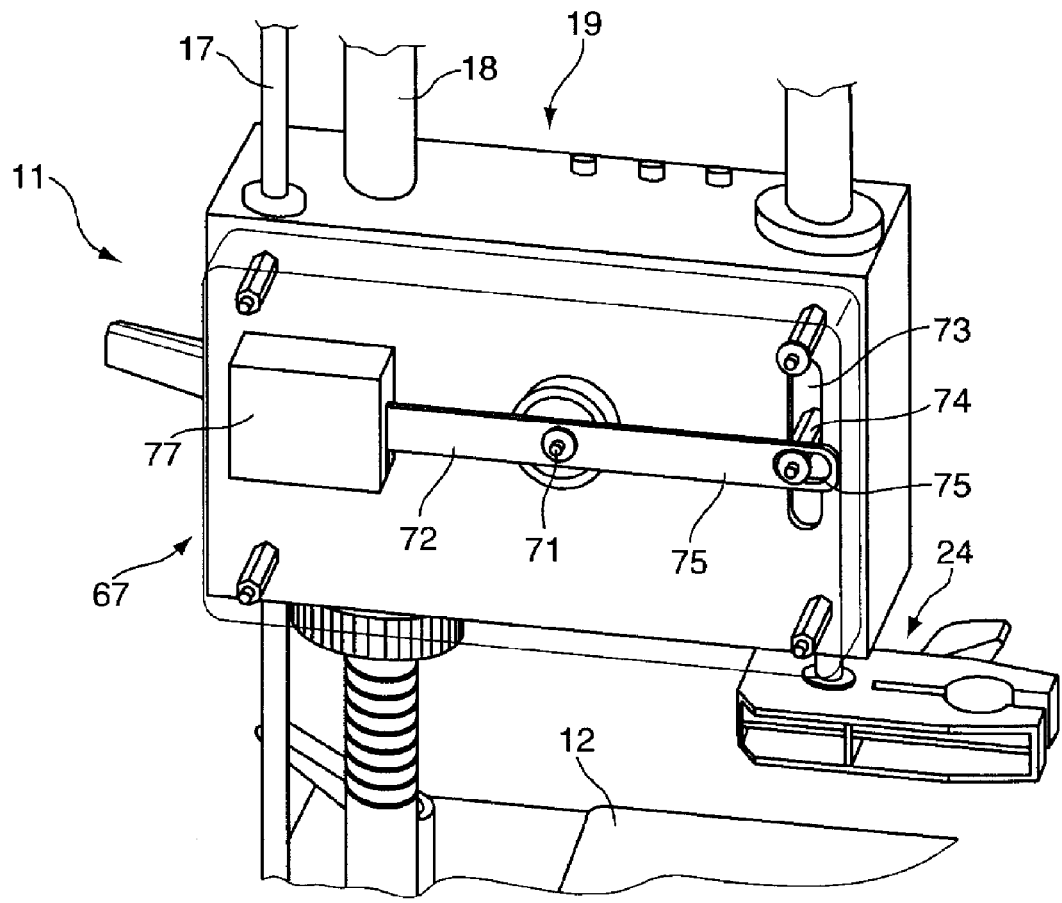
FIG. 6 is a perspective view of a rear wall of the housing of the measurement stand according to FIG. 1 with a weight relieving mechanism arranged thereon.

In FIG. 6, a weight relieving mechanism 68 is provided on a rear side 67 of the housing 19. This weight relieving mechanism 68 may be mounted in cases in which the retainer 24 holds a plurality of measuring probes 26 or sensors or larger or heavier measuring probes 26 or the like. This weight relieving mechanism 68 causes the at least one measuring probe 26 to touch down on the surface to be measured with only a low force of own weight. The weight relieving mechanism 68 is fastened to the rear wall 67 via a bearing axis 71 and pivotally accommodates a lever arm 72. On one end of the lever arm 72, a fastening pin 74 is provided which is applied to the displacement member 23 and penetrates a through hole 73 formed in the rear wall 67. The fastening pin 74 is fastened in a slot-like recess 75 of the lever arm 72, such that a compensating movement is enabled during the swinging movement of the lever arm 72. On the opposite side, the lever arm 72 is provided with at least one mass body 77. The latter may be movable along the lever arm 72, depending on the load to be held by the retainer 24. In addition, the mass body 77 provided on the lever arm 72 may be replaceable, such that it is possible to fasten larger or smaller mass bodies 77 thereon. Preferably, the weight relieving mechanism 68 is covered and protected by a cover.

In FIGS. 7a and 7b, a retainer 24 is represented which accommodates, for example, a measuring probe 26 and a further probe or a sensor. In the embodiment, a distance detection sensor 80 is represented. The retainer 24 is formed by a guide 89 allowing torsion which surrounds the displacement member 23 in the housing 19 and makes it possible for the retainer 24 to be disposed in a first angular position 81 and in a second angular position 82. Preferably, the respective angular positions 81, 82 may be fixed in a self-holding manner by means of a releasable screen arrangement. This makes it possible for both the measuring probe 26 and the distance detection sensor 80 to be capable of being selectively moved to a position immediately above the surface of the object of measurement 14. By way of example, this makes it possible to first use the distance detection sensor 80 to perform a distance measurement with respect to the surface of the object of measurement 14, and subsequently, depending on the travel required, to displace the measuring probe 26 and to activate a suitable movement of travel permitting a gentle touchdown on the surface to be measured.

A measurement stand 11 of this type is preferably used for measuring the thickness of layers. Layer thicknesses can be measured by utilising a magnetic inductive method or an eddy current method. Which method is used, depends on the substrate material and on the layers to be measured. By way of example, the magnetic inductive method is used for non-magnetic layers on ferromagnetic substrate materials. In the case of electrically non-conducting layers on ferrous metals, use is made of the eddy current method.

Alternatively, the measurement stand 11 may also be used for other measuring tasks. The retainer 24 is releasably arranged on the displacement member 23, such that depending on the measuring elements a retainer 24 adapted thereto may be arranged on the displacement member 23.

Measurement stands 11 of this type are used in particular for the thickness measuring of thin layers, as a touchdown of the measuring probe 26 on the surface to be measured would occur with different speeds or forces if the measurement using said measuring probe 26 were performed manually, which would, in addition, lead to a damaging of the surface of the object of measurement 14 and to a distortion of the measured values.

The measurement stand 11 may be operated according to the method described hereinafter:

An object of measurement 14 is positioned, either directly or indirectly, on the measuring table 12. The retainer 24 accommodates a measuring element, in particular a retainer 26 for measuring the thicknesses of thin layers. This measuring probe 26 is connected to a separate measuring device. The housing 19 is pre-positioned, as far as its height is concerned, in such a manner that the distance between the measuring probe 26, or the probe tip of the measuring probe 26, and the surface of the object of measurement 14 is situated within the working range of the displacement member 23, i.e. within the travel of the drive unit 35 for the up and down movement of the displacement member 23.

The measuring probe 26 is represented in the starting position 31. Prior to the performing of measurements, the position of the surface of the object of measurement 14 with respect to the starting position 31 is determined by means of a learning routine. This may be initiated, for example, by actuating the push button 29. In the course of this learning routine, the motor 34 is driven by the control unit with a constant current, which results in a constant motion of travel of the measuring probe 26 towards the measuring position 32. Immediately after the touchdown of the measuring probe 26 on the surface of the object of measurement 14, the free-wheel mechanism 51 is activated and the switching device 58 delivers a switching signal to the control unit. This position of the switching device 58 is represented in broken line in FIG. 5, for example, with the switching distance that has to be covered before a switching signal is delivered being adjustable and a switching signal being capable of being detected and delivered already at a distance of travel of the switching vane of less than 1 mm. Based on this control signal, the motor 34 is set to a standstill, with a lagging of the motor 34 having no negative consequences, due to the free-wheel mechanism 51. The movement of travel covered from the starting position 31 to the initiation of the switching signal of the switching device 58 is detected by displacement transducers 39. Along these travel paths, impulses are detected by the displacement transducer 39. After the motor 34 has been set to a standstill, a return movement of the measuring probe 26 to the starting position 31 is activated by the control unit, with the measuring probe 26 being preferably moved beyond the starting position 31 and subsequently performing a down movement to return to the starting position. Thus, an accurate positioning in the starting position 31 is ensured. From this learning routine, a travel speed profile is established for the subsequent measurements in which the measuring probe 26 touches down on the surface to be measured. For the subsequent measurement, first a movement of travel in a rapid mode is initiated by the control unit. Immediately before the touchdown of the measuring probe 26 on the surface of the object of measurement 14 and before the measuring position 32 is reached, the movement of travel is switched into a creep mode so as to ensure a gentle touchdown on the surface to be measured. In the course of this, a leading speed reduction is performed, such that the measuring probe 26 reaches the measuring position 32 in a gentle manner. Owing to the preceding detection of the travel path between the starting position 31 and the measuring position 32, a time optimised movement of travel of the measuring probe 26 may be determined, since the speed reduction before the touchdown of the measuring probe 26 on the surface to be measured is determined as far as the distance of travel required therefore is concerned, and subsequently the remaining travel is provided for the rapid mode. Owing to the fact that during the learning routine, the touchdown of the measuring probe 26 always occurs before the delivery of the switching signal, it is ensured that the measuring probe 26 will always occupy the measuring position 32 at identical measuring conditions with regard to the object of measurement 14. In this way, a plurality of measurements may be performed, with an exact movement of travel being always ensured due to the impulses detected between the starting position 31 and the measuring position 32.

A further method according to the invention, in particular for measuring the thickness of thin layers on objects of measurement, is as follows:

On the retainer 16 a measuring probe 26 is fastened which is connected to the control unit of the measurement stand 11. The height of the housing 19 is pre-adjusted, by analogy with the preceding method, in accordance with the measuring task that is to follow. Preferably, the measuring probe 26 is positioned at a distance of, for example, 5 to 10 mm from the surface to be measured, although the working range of the displacement member 23 may comprise, for example, 25 to 65 mm. The measuring probe 26 works as a distance detection sensor as it is transferred from the starting position 31 to the measuring position 32. Preferably, measuring probes 26 of this type are incapable of detecting the object of measurement 14 from a distance of, for example, more than 2 to 4 mm above the surface to be measured. With this basic construction, a preceding learning routine is not required for performing a measurement. Rather, the motor 34 is activated by the control unit after pressing the push button 29', such that a lowering movement is initiated. As soon as the measuring probe 26 first detects an object of measurement 14, a control signal is delivered to the control unit. Owing to this signal, another travel speed of the measuring probe 26 is activated, depending on a change in the signal detected by the measuring probe 26, in particular a change in voltage. As the voltage change of the measuring probe 26 becomes smaller and smaller, the intensity of electrical current provided for activating the motor 34 will be reduced accordingly. Thus, an increasing approximation of the measuring probe 26 towards the measuring position 32 will lead to an increasing reduction in the travel speed, such that the measuring probe 26 touches down gently on the surface to be measured. The reaching of the measuring position 32 may be assessed by the measuring probe 26 by the fact that no change in tension is detected or that a control signal signalling the activation of the free-wheel mechanism 51 is emitted by the switching device 58. The measuring signal of the measuring probe 26 which is detected at this point in time serves for layer thickness measuring. Each measuring probe 26 has a specific probe characteristic for a given material to be tested, which is to say that a defined distance from the substrate material corresponds to a voltage signal and, consequently, the layer thickness may be derived from the detected voltage signal. The actuation of the push button 29' initiates a single movement of travel from the starting position to the measuring position and back again to the starting position. The actuation of the push button 29'' may initiate the one-time routine described above several times consecutively, the number of repetitions being preferably programmable.

The measurement stand 11 further allows a method of contactless measurement of layer thicknesses to be performed on material webs which are passed through below the measuring probe 26:

The measuring probe 26 is again connected to the control unit in the same manner as in the method precedingly described. In the control unit a reference signal, in particular a reference voltage, is stored which corresponds to a defined distance of the measuring probe 26 from the surface of the object of measurement. This reference signal, or this reference voltage determines the measuring position 32 of the measuring probe 26 for the contactless measurement, as represented in FIG. 8. For performing a measurement, the measuring probe 26 is displaced downwards from the starting position 31 until a control signal is emitted by the measuring probe 26 which corresponds to the reference signal. A closed-loop control may be performed for ensuring an exact positioning, such that when the exact measuring position 32 has been overrun, a reciprocating movement is provided until the exact measuring position 32 is reached. Subsequently, a contactless layer thickness measurement may be carried out.

Adjacent to the measuring probe 26, a distance detection sensor 80 may be positioned on the retainer 24 of the displacement member 23. The latter may detect the distance between the measuring position 32 and the surface 83 to be measured. The measuring probe 26 preferably determines the distance between the measuring position 32 and a surface 84 of a substrate material 85 of the object of measurement 24. The difference between the two values yields the determined layer thickness, provision being made for a correction value determined in advance by calibrating the measuring probe 26 with respect to the distance detection sensor 80. This method is particularly suitable for measuring web-like, coated materials which are passed through below the measuring probe 26 and the distance detection sensor 80 in the direction of the arrow 86. Preferably, this method may also be used in order to detect the thickness of a highly viscous coating, in particular a liquid film of a coating on the carrier material or substrate material 85 which has not yet completely dried. Furthermore, in this method, in which a web-like material is concerned, which is mostly not ideally flat, provision is preferably made for the control unit to pick up control signals from the measuring probe 26 and to compare them with a reference signal. The measuring probe 26 detects the distance between the measuring position 32 and the surface 84 of the substrate material 85. If any deviation from the predetermined reference value is detected, the motor 34 is activated so as to move the displacement member 23 up and down, such that the deviation is compensated for. In this way, both the measuring probe 26 and the distance detection sensor 80 are held, in a quasi-floating manner, above the material web which is passed through below. As an alternative to this type of controlling, provision may be made for the predetermined distance of the measuring probe 26 and the distance detection sensor 80 with respect to the object of measurement 24 to be determined and controlled not by the measuring probe 26 but by the distance detection sensor 80. In doing so, the surface 83 to be measured of the coating is taken as a basis of reference for the positioning of the measuring probe 26 and the distance detection sensor 80.

It is to be understood that instead of the measuring probe described hereinabove other measuring instruments or measuring devices may be used and are encompassed within the scope of the present invention.

The invention claimed is:

1. A method for electrically controlling a measurement stand with a movement of travel of at least one measuring probe from a pre-set starting position to a measuring position, in which method a motor is activated which, for performing at least one measurement, uses a drive unit for moving a displacement member up and down on which the measuring probe is fastened by means of a retainer, wherein the method comprises:

performing a learning routine before carrying out a first measurement, the learning routine including:
lowering the measuring probe with a predetermined speed of travel until the measuring probe rests on a surface of an object of measurement,
activating a free-wheel mechanism between the drive unit and the displacement member after the touchdown of the measuring probe on the surface of the object of measurement, the free-wheel mechanism when activated decoupling the drive unit with respect to the displacement member,
using a switching device to detect activation of the free-wheel mechanism and to provide a control signal for stopping the motor, and
detecting the travel of the measuring probe between the pre-set starting position and the touchdown position when the free-wheel mechanism is activated, after which the learning routine is terminated.

2. The method as claimed in claim 1, wherein the travel of the measuring probe between the pre-set starting position and the touchdown position is determined by a number of impulses produced by a displacement transducer.

3. The method as claimed in claim 1, wherein the travel of the measuring probe is detected by a displacement transducer which is arranged separately from the motor.

4. The method as claimed in claim 1, wherein the travel of the measuring probe from the starting position to the touchdown position for performing a measurement is subdivided into a relatively rapid-mode phase and, subsequently thereto, a relatively slow-mode phase.

5. A method for electrically controlling a measurement stand with a movement of travel of at least one measuring probe from a starting position to a measuring position, in particular for measuring the thickness of thin layers, in which method a motor is activated which, for performing a measurement, uses a drive unit for moving a displacement member up and down on which the measuring probe is fastened by means of a retainer, the method comprising:

supplying signals from the measuring probe to a control unit of the measurement stand during movement of the measuring probe from the starting position to the measuring position,
moving the measuring probe towards an object of measurement and as a measuring signal of the object of measurement is first detected,
reducing the travel speed of the measuring probe towards the object of measurement depending on a change in the signal from the measuring probe,
continuing reduced speed movement of the measuring probe toward the object of measurement at least until touchdown of the measuring probe on a surface of the object of measurement,
activating a free-wheel mechanism between the drive unit and the displacement member after the measuring probe has touched down on the surface of the object of measurement, the free-wheel mechanism when activated decoupling the interaction between the drive unit and the displacement member,
using a switching device to detect the activation of the free-wheel mechanism and provide a control signal for stopping the motor, and
detecting the measuring signal of the measuring probe upon, or after, touchdown of the measuring probe on the surface of the object of measurement.

6. The method as claimed in claim 5, wherein a voltage signal of the measuring probe is used to activate the motor for displacing the displacement member.

7. A method for electrically controlling a measurement stand with a movement of travel of at least one measuring probe from a starting position to a measuring position, in particular for measuring the thickness of thin layers, in which method a motor is activated which, for performing a measurement, uses a drive unit for moving a displacement member up and down on which the measuring probe is fastened by means of a retainer, the method comprising:

supplying signals from the measuring probe to a control unit of the measurement stand during movement of the measuring probe from the starting position to the measuring position,
reducing the speed of travel of the measuring probe towards the object of measurement depending on a change of the signal supplied by the measuring probe, and
stopping movement of the measuring probe after reaching a reference signal that defines the measuring position of the measuring probe for the contactless measurement.

8. The method as claimed in claim 7, wherein the measuring probe, when in the measuring position, is positioned in a contactless manner with respect to the object of measurement on a web that is moved along, in a continuous or non-continuous manner, beneath the measuring position, and a distance control of the measuring probe via the reference signal is performed in accordance with the actually detected control signal of the measuring probe.

9. The method as claimed in claim 7, wherein a distance detection sensor is associated with the measuring probe and that, prior to performing the first measurement, the distance detection sensor, when in a measuring position of the measuring probe determined by the reference signal, is preferably calibrated to a reference surface or that a further, radiation-emitting probe is associated with the measuring probe which is provided for performing beta particle backscattering technique or is operated according to an X-ray fluorescence method.

10. The method for electrically controlling a measurement stand with a movement of travel of at least one measuring probe from a starting position to a measuring position, in particular for measuring the thickness of thin layers, in which method a motor is activated which, for performing a measurement, uses a drive unit for moving a displacement member up and down on which the measuring probe is fastened by means of a retainer, the method comprising:

detecting the distance between a pre-set starting position of the measuring probe and a surface of the object of measurement by means of a distance detection sensor attached on a retainer of the displacement member, and
controlling the speed of travel of the measuring probe depending on the distance of the measuring probe from the surface of the object of measurement such that the measuring probe is caused to touch down gently on the surface of the object of measurement.

11. A measurement stand for holding at least one measuring probe, in particular for performing the method as claimed in claim 1, said measurement stand having
- a housing in which a displacement member with a drive unit driven by a motor is guided in such a way as to be movable up and down,
- a retainer arranged on the displacement member which holds the measuring probe,
- a control unit which activates at least the motor for displacing the displacement member,
- a free-wheel mechanism provided between the drive unit and the displacement member which, when activated upon touchdown of the measuring probe or of the retainer on the object of measurement, decouples the drive unit from the displacement member, and
- a switching device that delivers, upon activation of the free-wheel mechanism, a switching signal to the control unit.

12. The measurement stand as claimed in claim 11, wherein the displacement member is guided within the housing so as to be movable up and down along an axis of movement, such that the at least one measuring probe is capable of being lowered by the force of its own weight.

13. The measurement stand as claimed in claim 11, wherein during the movement of travel of the measuring probe between the starting position and the measuring position the displacement member, via an abutting surface, rests on a contact surface of the drive unit, that the contact surface of the drive unit is provided on a coupling member which engages a driving member of the drive unit, and that the coupling member is guided on a guide in such a manner as to be movable up and down.

14. The measurement stand as claimed in claim 13, wherein the displacement member is coupled with a carriage which is movable along the guide which is arranged vertically within the housing.

15. The measurement stand as claimed in claim 14, wherein on the carriage a guide rod is arranged which, with an end disposed opposite the carriage, is movable up and down in a further guide formed within the housing.

16. The measurement stand as claimed in claim 13, wherein on the coupling member a sensor element is arranged which detects an upper end position of the drive unit.

17. The measurement stand as claimed in claim 13, wherein the drive unit comprises a toothed belt which serves as a driving member and is received by two return pulleys, one return pulley being provided as a drive roller of the motor and the other return pulley preferably driving a displacement transducer.

18. The measurement stand as claimed in claim 11, wherein the switching device has a first component and a second component, the first component being arranged on the carriage or on the displacement member and the second component being arranged on the coupling member of the drive unit and the switching device being realized as a forked light barrier with a switching vane, a touch sensor, a distance detection sensor or a breaker contact.

19. The measurement stand as claimed in claim 14, wherein between the displacement member and the carriage a guide allowing torsion is arranged by means of which the displacement member may be pivoted in at least two angular positions, differing from each other, and secured therein by means of a releasable catch.

20. The measurement stand as claimed in claim 11, wherein on the displacement member or on the carriage, a weight relieving mechanism may be attached which preferably has a lever arm which is rotatable in a bearing axis and which, on the one hand, acts on the displacement member or on the carriage and, on the other hand, receives a mass body in such a manner as to be displaceable along the lever arm and/or exchangeable.

* * * * *